__United States Patent Office__ 3,024,210
Patented Mar. 6, 1962

3,024,210
METHOD OF OBTAINING ROOM TEMPERATURE ORGANOPOLYSILOXANE RESIN FOAMS AND PRODUCT OBTAINED THEREFROM
Donald E. Weyer, Midland, Mich., assignor to Dow Corning Corporation, Midland, Mich., a corporation of Michigan
No Drawing. Original application Oct. 15, 1956, Ser. No. 615,756. Divided and this application Nov. 18, 1959, Ser. No. 853,697
10 Claims. (Cl. 260—2.5)

This invention relates to a method of preparing organosilicon foams at room temperature and to the foams so prepared.

This application is a division of my copending application Serial No. 615,756, filed October 15, 1956, now abandoned, which in turn was a continuation-in-part of my now abandoned application Serial No. 516,739, filed June 20, 1955, as a continuation-in-part of my now abandoned application Serial No. 501,205, filed April 13, 1955.

Various methods of preparing organosilicon foams are known in the art. These foams have been prepared by heating an organosilicon resin with or without a blowing agent. Heretofore employed blowing agents were in general organic compounds which decomposed upon heating to give off a gas. These materials make excellent foams but require temperatures in excess of 100° C. in order to give proper expansion of the resin.

In my United States Patent 2,833,732, dated May 6, 1958, and filed August 25, 1954, it was disclosed that foams could be prepared by heating combinations of organosilicon compounds containing SiH groups and hydroxylated compounds. It was stated in that application that the foams so prepared were less friable than organosilicon foams previously known. While the method described therein could be used for the production of foams at room temperature, the time necessary to achieve a finished foam was generally longer than desired for commercial applications.

There is a substantial need for foams which can be expanded and cured in relatively short time periods at room temperature. These foams are especially useful for insulating large equipment of irregular or complicated shapes. Such equipment cannot be conveniently heated in an oven; thus, the foams cannot be expanded in place by heating. Also since the shapes are irregular and complicated it is not convenient and is often times impossible to insulate the equipment with previously expanded foams. The only solution to the problem lies in expanding the foam in place at room temperature. However, for commercial utility it is desirable that the in place foaming can be accomplished in a relatively short length of time. Whereas such foams have been prepared from certain organic resins, there was heretofore no known method for producing them from organopolysiloxane resins.

It is the object of this invention to prepare siloxane foams at room temperature. Another object is to provide a method of insulating equipment with heat stable foams. Other objects and advantages will be apparent from the following description.

In accordance with this invention a foam is prepared by mixing (1) an organopolysiloxane having per silicon atom on the average from 1 to 1.8 organic radicals of the group consisting of monovalent hydrocarbon radicals, halogenated monovalent hydrocarbon radicals and halophenoxymethyl radicals, at least 1 percent by weight of the siloxane units in said polysiloxane having at least 1 hydrogen atom attached to the silicon atom thereof, (2) from .001 to 30 percent by weight based on the weight of said polysiloxane of a catalyst of the group quaternary ammonium hydroxides, quaternary ammonium alkoxides, quaternary ammonium salts of aliphatic carboxylic acids, said acids having at least 5 carbon atoms, and quaternary ammonium salts of silanols and (3) a non-acidic hydroxylated compound and thereafter allowing the mixture to expand into a foam.

When the above ingredients are mixed, the composition will automatically expand to a foam upon standing, and in general there is an initiation period of from ½ to 15 minutes depending upon the concentration of the catalyst and the amount of hydrogen containing siloxane in the polysiloxane. The expansion is due to rapid evolution of hydrogen. This expansion takes place at room temperature or below, and the resulting foam has a permanent structure which does not collapse after evolution of the gas has stopped. If desired, the foams may thereafter be heated in order to further cure the resin although such heating is not necessary.

The organopolysiloxanes which are operative in this invention range from those which contain at least 1 percent by weight siloxane units having at least 1 hydrogen atom attached thereto to those in which every silicon atom has hydrogen attached thereto. In addition, the siloxane contains an average of at least 1 organic radical of the aforesaid types per silicon atom. For the purpose of this invention the polysiloxanes may be either homopolymers, copolymers, or mixtures of homopolymeric or copolymeric siloxanes.

From the above it can be seen that the homopolymeric and copolymeric siloxanes may be of the formula $$(RHSiO)_x$$

In addition, the siloxanes of this invention may be copolymers in which some of the silicon atoms have hydrogen bonded thereto and some do not. For example, these copolymeric siloxanes may be combinations of units of the formula $HSiO_{3/2}$, $H_2SiO$, $RHSiO$, $RH_2SiO_{1/2}$, $R_2HSiO_{1/2}$, 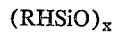 $RSiO_{3/2}$, $R_2SiO$, $R_3SiO_{1/2}$ and $SiO_2$. In those cases where the siloxane is a mixture of two or more molecular species it is not necessary that each molecular species contain silicon bonded hydrogen.

Specific examples of organic radicals (i.e. R groups) which can be substituted on the silicon atom are monovalent hydrocarbon radicals such as alkyl radicals, e.g. the methyl, ethyl and octadecyl radicals; alkenyl radicals, e.g. the vinyl, allyl and hexenyl radicals; cycloaliphatic radicals, e.g. the cyclopentyl, cyclohexyl and cyclohexenyl radicals; aryl hydrocarbon radicals, e.g. the phenyl, xenyl, tolyl and naphthyl radicals; and alkaryl hydrocarbon radicals, e.g. the benzyl radical. The organic radicals can also be any halogenated monovalent hydrocarbon radical such as the chloromethyl, trifluorovinyl, chlorotrifluorocyclobutyl, α,α,α-trifluorotolyl, chlorophenyl, bromoxenyl, pentafluoroethyl and pentafluoropropenyl radicals. The organic radicals can also be any halophenoxy methyl radical such as the pentachlorophenoxymethyl, dibromophenoxymethyl and trichlorophenoxymethyl radicals.

The siloxanes employed in this invention may or may not contain silicon-bonded hydroxyl radicals. Preferably, however, there should be at least .5 percent by weight silicon-bonded hydroxyl groups in the siloxane. This is especially true when the amount of silicon-bonded hydrogen in the siloxane is low. It should be understood, however, that it is not essential that the siloxane contain any silicon-bonded hydroxyl groups.

Catalysts which are operative in this invention have the common feature of causing rapid evolution of hydrogen at room temperature. They can be added per se or generated in situ, e.g. a quaternary ammonium hydroxide and a silanol to form a quaternary ammonium salt of a silanol although the hydroxide alone is a catalyst. Preferably the catalysts are employed in amount from 1 to 10 percent by weight based on the weight of the soloxane. In general, the optimum amount of catalyst will depend upon the concentration of SiH in the composition. For any given system less catalyst is required for higher concentrations of SiH than for lower concentrations.

It has been found that of the many catalysts which are known to cure siloxanes, the ones herein defined are far superior to any others for the preparation of room temperature foams. These catalysts include any quaternary ammonium hydroxide of the type $R'_4NOH$; any quaternary ammonium alkoxide of the formula $R'_4NOR''$; any carboxylic acid salt of a quaternary ammonium hydroxide of the formula $R'_4NOOCR'''$ in which $R'''$ is an aliphatic hydrocarbon radical of at least 4 carbon atoms and any silanol quaternary ammonium salt of the formulae $R_3SiONR'_4$,

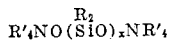

and

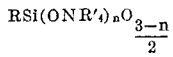

where R is as above defined and $n$ has a value of from 1 to 3 inclusive.

For the purpose of this invention $R'$ in the quaternary ammonium compounds can be any aliphatic hydrocarbon radical such as the methyl, ethyl, butyl and octadecyl radicals; any alkenyl radical such as the vinyl, allyl and hexenyl radicals; any cycloaliphatic hydrocarbon radical such as the cyclhexyl, cyclopentyl and cyclohexenyl radicals; any aromatic hydrocarbon radical such as the phenyl, xenyl and tolyl radicals; any alkaryl hydrocarbon radical such as the benzyl and beta-phenylethyl radicals and any hydroxylated hydrocarbon radical such as the hydroxyethyl, hydroxypropyl, hydroxycyclohexyl, hydroxylphenyl and hydroxyhexenyl radicals.

For the purpose of this invention $R''$ can be any alkyl radical such as the methyl, ethyl, butyl and octadecyl radicals and $R'''$ can be any alkyl radical of at least 4 carbon atoms such as the butyl, hexyl, 2-ethylhexyl and decyl radicals.

The third ingredient in the process of this invention is a hydroxylated compound. For the purpose of this invention the hydroxylated compound can be an organosilicon compound containing silicon-bonded hydroxyl groups. Thus ingredients 1 and 3 can be identical in the process of this invention. For example, if a hydroxylated siloxane resin is employed, it is not necessary to add any additional hydroxylated compound in order to produce a foam. In general, however, it is preferable to add additional hydroxylated compound, and this can be in the form of any non-acidic material having an active hydroxyl group thereon. The amount of such additional compound is not critical; however, it is preferred that any additional hydroxylated compound be employed in an amount less than 50 percent by weight based on (1). Thus for the purpose of this invention the hydroxylated compound can be a low molecular weight silanol, water, or an organic alcohol such as ethanol, butanol, ethylene glycol, propylene glycol, diethylene glycol and polyalkylene glycols in general, glycerol, pentaerythritol, alkanol amines such as ethanol amine or triethanol amine, hydroxy esters and hydroxylated polyesters, hydroxy ethers such as hydroxyethyl methyl ether, and alcohols containing halogen, nitro, nitrile and other non-acidic functional groups.

A fourth and optional ingredient which may be employed in producing the foams of this invention is an alkoxy polysilicate. When employed, the polysilicate gives improved cell structure and faster hardening time at room temperature. The silicate should be employed in a minor amount based on the weight of the siloxane and preferably should be used in amounts up to 8 percent by weight since there is no advantage in employing more although larger amounts can be used if desired. The term "alkoxy polysilicate" includes any fluid polysilicate having any alkoxy group substituted on the silicon. For example the alkoxy groups can be methoxy, ethoxy, isopropoxy, butoxy, 2-ethylhexoxy or stearyloxy. Preferably the alkoxy group should contain less than 10 carbon atoms.

The ingredients may be mixed in any desired manner. Preferably an efficient mechanical mixer should be employed since the more thorough the mixing the less dense will be the foam produced.

If desired, various other ingredients such as fillers, stabilizing agents and plasticizers such as siloxane fluids can be incorporated in the foams of this invention. Suitable fillers include powdered metals such as aluminum, tin and zinc; powdered silicon, silica, mica, clay and metal oxides. Suitable flame retardants are antimony oxide, calcium carbonate, polychlorinated hydrocarbons such as polychlorinated biphenyls and polychlorinated paraffin oils and organic sulfamates. Additional catalysts can also be included if desired to aid in the curing of the resin. These catalysts can be any of the conventional catalysts normally employed in siloxane resins such as metal salts of carboxylic acids and amines.

The foams of this invention are useful as thermal insulation for pumps, motors, pipe, fire walls and other equipment and for light weight reinforcing material in structural members.

For the purpose of this invention it is often desirable to include a solvent in the organosiloxane. This is particularly true where the siloxane is ordinarily a solid. Suitable solvents include hydrocarbons such as benzene, toluene, xylene, petroleum naphtha and the like and chlorinated solvents such as methylene chloride, ethylene chloride and the like.

The foams prepared by the method of this invention are characterized by uniform pore structure and uniform density. The pore size and density can be varied by varying the amount of hydrogen containing siloxane relative to the amount of catalyst. In general, the denser foams are obtained with smaller amounts of silicon-bonded hydrogen present and the lighter foams are obtained with larger amounts of the silicon-bonded hydrogen. Also the density of the foam tends to decrease with more rapid evolution of hydrogen. This may be accomplished by increasing the amount of catalyst and/or the amount of hydroxylated compound in the system. In general, the foams prepared by the method of this invention range in density from 3 to 30 lbs. per cu. ft., although more dense or less dense materials can be prepared if desired.

The following examples are illustrative only and should not be construed as limiting the invention which is properly set forth in the appended claims. All of the runs in the examples were carried out at room temperature.

EXAMPLE 1

The siloxane employed in the resins of this example was in each case a mixture of 86.5 g. of a copolymer of 31.3 mol percent phenylmethylsiloxane, 31.3 mol percent monophenylsiloxane, 31.3 mol percent monomethylsiloxane and 6.1 mol percent diphenysiloxane, said copolymer containing about 4 percent by weight silicon-bonded hydroxyl groups, 13.5 g. of toluene and the amount shown in the table below of a 25 cs. fluid copolymer of methylhydrogen-siloxane and trimethylsiloxane. To these siloxanes was added in each case a 20 percent solution in butanol of beta-hydroxyethylbenzyldimethylammoniumbutoxide in the amounts shown in the table. In each case the mixture was allowed to stand and a foam was formed as shown.

Table

| Amount of MeHSiO in g. | Amount of catalyst solution in cc. | Time in min. required for expansion to begin | Density of foam in lbs. per cu. ft. |
|---|---|---|---|
| 12.5 | 3.75 | 15 | 20.9 |
| 15 | 4.5 | 15 | 21.9 |
| 25 | 6 | 3 | 23.1 |

EXAMPLE 2

This example shows that the density of the foams is lowered by increasing the amount of hydroxylated compound in the composition. In each of the runs shown below the foam was prepared by mixing 86.5 g. of the phenylmethylsiloxane copolymer of Example 1, 12.5 g. of a 25 cs. fluid composed of copolymerized methylhydrogen-siloxane and trimethylsiloxane and 3.75 cc. of a 20 percent butanol solution of beta-hydroxyethylbenzyl-dimethylammoniumbutoxide, together with the amount of the various compounds shown in the table below. In each case a foam was formed as indicated.

Table

| Hydroxylated compound | Amount in g. | Time in min. required for expansion to begin | Density in lbs. per cu. ft. |
|---|---|---|---|
| Ethylene glycol | 1 | 7 | 17.2 |
| Do | 2 | 5 | 14.1 |
| Do | 3 | | 13.9 |
| Glycerol | 2 | 7 | 15.1 |
| Water | 5 | 21 | 16.8 |
| 29% aqueous ammonia | 2 | 5 | 16 |

EXAMPLE 3

To a mixture of 300 g. of a copolymer of 40 mol percent phenylmethylsiloxane, 10 mol percent phenylhydrogensiloxane, 20 mol percent methylhydrogensiloxane and 30 mol percent monophenylsiloxane and 6 g. of ethylene glycol, there was added with stirring 9 cc. of the catalyst solution of Example 1. After 3 minutes expansion of the resin began and the expansion was complete after 30 minutes. The resulting foam had a fine uniform pore size and a density of 8.2 lbs. per cu. ft.

EXAMPLE 4

100 g. of a copolymer of 40 mol percent phenylmethylsiloxane, 25 mol percent monophenylsiloxane and 35 mol percent methylhydrogensiloxane, said copolymer containing silicon-bonded hydroxyl groups, was mixed with 4 cc. of the catalyst solution of Example 1. The mixture began to foam in 3 minutes and the foaming was complete after 15 minutes. The resulting foam had a fine uniform cell structure and a density of 22 lbs. per cu. ft.

EXAMPLE 5

100 g. of a copolymer of 18 mol percent monophenylsiloxane, 15 mol percent phenylhydrogensiloxane, 15 mol percent monomethylsiloxane, 17½ mol percent methylhydrogensiloxane, 27 mol percent phenylmethylsiloxane and 7.5 mol percent diphenylsiloxane and 2 g. of water were mixed with 4 cc. of the catalyst solution of Example 1. Foaming began within 3 minutes and was complete within 60 minutes. The resulting foam had a coarse cell structure and a density of 7.8 lbs. per cu. ft.

This run was repeated except that 2 g. of glycerol was employed in the place of the water. Foaming started within 2 minutes and was complete within 50 minutes. The resulting foam had a coarse cell structure and a density of 6.5 lbs. per cu. ft.

EXAMPLE 6

100 g. of a copolymer of 30 mol percent phenylmethylsiloxane, 25 mol percent methylhydrogensiloxane, 5 mol percent dimethylhydrogensiloxane and 40 mol percent monophenylsiloxane were mixed with 4 cc. of the catalyst solution of Example 1. Foaming began within 2 minutes and was complete within 30 minutes. The resulting foam had a density of 25 lbs. per cu. ft.

EXAMPLE 7

100 g. of a copolymer of 40 mol percent phenylmethylsiloxane, 20 mol percent methylhydrogensiloxane, 30 mol percent monophenylsiloxane and 10 mol percent $HSiO_{3/2}$ were mixed with 2 g. of butanol and 2 cc. of the catalyst solution of Example 1. Expansion began at once and was complete within 10 minutes. The resulting foam had a density of 22 lbs. per cu. ft.

EXAMPLE 8

Equivalent results were obtained when benzyltrimethylammoniumbutoxide and ethyl tris(beta-hydroxyethyl)-ammoniumbutoxide were employed as the catalyst in the procedure of Example 3.

EXAMPLE 9

Methanol solutions of the catalysts shown below were added to the compound $(MeHSiO)_5$ in amount such that in each case there was 10 percent by weight of the catalyst. Suitable foams were obtained in each case. The catalysts employed were benzyltrimethylammoniumhydroxide, beta-hydroxyethyltrimethylammoniumhydroxide, beta-hydroxyethyltrimethylammonium - 2 - ethylhexoate, the benzyltrimethylammonium salt of dimethylsiloxanol and the beta-hydroxyethyltrimethylammonium salt of monophenylsiloxanol.

EXAMPLE 10

10 g. of a copolymer containing silicon-bonded hydroxyl groups and having the composition 33 mol percent monophenylsiloxane, 32.5 mol percent methylhydrogensiloxane, 27 mol percent phenylmethylsiloxane and 7.5 mol percent diphenylsiloxane were mixed with .15 cc. of a 20 percent butanol solution of beta-hydroxyethyltrimethylammonium-2-ethylhexoate and .05 cc. of a 20 percent butanol solution of beta-hydroxyethylbenzyldimethylammoniumbutoxide. Foaming began in .5 minute to give a uniform foam having a density of 18 lbs. per cu. ft.

EXAMPLE 11

Equivalent results are obtained when $(EtHSiO)_5$ is substituted for $(MeHSiO)_5$ in the procedure of Example 9.

EXAMPLE 12

Satisfactory foams are obtained when 100 g. of a copolymer of 10 mol percent monovinylsiloxane, 10 mol percent monooctadecylsiloxane, 10 mol percent pentachlorophenoxymethyl methylsiloxane, 15 mol percent $F_3CC_6H_4SiO_{3/2}$, 50 mol percent dimethylsiloxane and 5 mol percent $HSiO_{3/2}$ are mixed with 10 g. of a copolymer of methylhydrogensiloxane and trimethylsiloxane, 3 g. of propylene glycol and 4 cc. of the catalyst solution of Example 1 and the mixture is thereafter allowed to stand at room temperature.

EXAMPLE 13

To a mixture of 100 g. of methylphenylpolysiloxane resin containing silicon-bonded OH groups and having an average of 1.36 total methyl and phenyl groups per silicon atom, 11 g. of methylene chloride, 10 g. of propylene glycol, 4 g. of ethyl polysilicate and 6 g. of mixed cyclic methylhydrogensiloxanes was added 4 cc. of a 35 percent by weight solution of benzyltrimethylammonium hydroxide in butanol. Foaming began at once to give a foam having a fine pore size and a density of 4 lbs. per cu. ft. The foamed resin hardened in 6 hours at room temperature.

EXAMPLE 14

In another run identical with Example 13 except that 20 g. of propylene glycol was used, the foamed resin had a density of 3.5 lbs. per cu. ft. and hardened in 6 hours at room temperature.

EXAMPLE 15

Equivalent results are obtained when isopropylpolysilicate, n-butylpolysilicate, ethyl-2-ethylhexylpolysilicate and mixtures thereof are employed in the procedure of Example 13.

That which is claimed is:

1. The method which comprises mixing (1) an organopolysiloxane having per silicon atom an average of from 1 to 1.8 organic radicals selected from the group consisting of monovalent hydrocarbon radicals, halogenated monovalent hydrocarbon radicals and halophenoxymethyl radicals, at least 1 percent by weight of the siloxane units in said polysiloxane having at least 1 hydrogen atom attached to the silicon atom thereof, (2) from .001 to 30 percent by weight based on the weight of the siloxane of a catalyst selected from the group consisting of quaternary ammonium hydroxides, quaternary ammonium alkoxides, quaternary ammonium salts of aliphatic carboxylic acids, said acids having at least 5 carbon atoms, and quarternary ammonium salts of silanols, and (3) a hydroxylated compound selected from the group consisting of silanols, water and organic non-acidic alcoholic compounds and thereafter allowing the mixture to expand into a foam.

2. A method which comprises mixing (1) an organopolysiloxane having per silicon atom an average of from 1 to 1.8 organic radicals selected from the group consisting of monovalent hydrocarbon radicals, halogenated monovalent hydrocarbon radicals and halophenoxymethyl radicals, at least 1 percent by weight of the siloxane units in said polysiloxane having at least 1 hydrogen atom attached to the silicon atom thereof, said polysiloxane containing silicon-bonded hydroxyl groups, and (2) from .001 to 30 percent by weight based on the weight of the siloxane of a catalyst of the group consisting of quaternary ammonium hydroxides, quaternary ammonium alkoxides, quaternary ammonium salts of aliphatic carboxylic acids, said acids having at least 5 carbon atoms, and quaternary ammonium salts of silanols and thereafter allowing the mixture to expand into a foam.

3. The method which comprises maxing (1) an organopolysiloxane having per silicon atom an average of from 1 to 1.8 organic radicals radicals selected from the group consisting of monovalent hydrocarbon radicals, halogenated monovalent hydrocarbon radicals and halophenoxymethyl radicals, at least 1 percent by weight of the siloxane units in said polysiloxane having a least 1 hydrogen atom attached to the silicon atom thereof, said siloxane containing silicon-bonded hydroxyl groups, and (2) from .001 to 30 percent by weight based on the weight of the siloxane of a catalyst of the group consisting of quaternary ammonium hydroxides, quaternary ammonium alkoxides, quaternary ammonium salts of aliphatic carboxylic acids, said acids having at least 5 carbon atoms, and quaternary ammonium salts of silanols, and (3) a hydroxylated compound selected from the group consisting of silanols, water and organic non-acidic alcoholic compounds and thereafter allowing the mixture to expand into a foam.

4. A foam prepared in accordance with the method of claim 1.

5. A foam prepared in accordance with the method of claim 2.

6. A foam prepared in accordance with the method of claim 3.

7. A method which comprises mixing (1) an organopolysiloxane having an average of from 1 to 1.8 methyl and phenyl groups per silicon atom, at least 1 percent by weight of the siloxane units in said polysiloxane having at least 1 hydrogen atom attached to the silicon atom thereof, (2) from .001 to 30 percent by weight based on the weight of the siloxane of a quaternary ammonium alkoxide, and (3) an organic non-acidic alcoholic compound and thereafter allowing the mixture to expand into a foam.

8. The method which comprises mixing (1) an organopolysiloxane having on the average from 1 to 1.8 methyl and phenyl radicals per silicon atom, at least 1 percent by weight of the siloxane units in said polysiloxane having at least 1 hydrogen atom attached to the silicon atom thereof, (2) from .001 to 30 percent by weight based on the weight of the siloxane of a quaternary ammonium hydroxide, and (3) an organic non-acidic alcoholic compound and thereafter allowing the mixture to expand into a foam.

9. The method which comprises mixing (1) an organopolysiloxane having per silicon atom an average of from 1 to 1.8 organic radicals selected from the group consisting of monovalent hydrocarbon radicals, halogenated monovalent hydrocarbon radicals and halophenoxymethyl radicals, at least 1 percent by weight of the siloxane units in said polysiloxane having at least 1 hydrogen atom attached to the silicon atom thereof, (2) from .001 to 30 percent by weight based on the weight of the siloxane of a catalyst selected from the group consisting of quaternary ammonium hydroxides, quaternary ammonium alkoxides, quaternary ammonium salts of aliphatic caroboxylic acids, said acids, having at least 5 carbon atoms, and quaternary ammonium salts of silanols (3) a hydroxylated compound selected from the group consisting of silanols, water and organic non-acidic alcoholic compounds and (4) an alkoxy polysilicate and thereafter allowing the mixture to expand into a foam.

10. A foam prepared in accordance with the method of claim 9.

References Cited in the file of this patent

UNITED STATES PATENTS

| 2,706,190 | Clark | Apr. 12, 1956 |
|---|---|---|
| 2,813,839 | Rust et al. | Nov. 19, 1957 |
| 2,833,732 | Weyer | May 6, 1958 |